(12) United States Patent
Nakagawa et al.

(10) Patent No.: US 7,157,885 B2
(45) Date of Patent: Jan. 2, 2007

(54) INVERTER CONTROLLED GENERATOR SET AND METHOD FOR CONTROLLING THE SAME

(75) Inventors: Masanori Nakagawa, Numazu (JP); Masahiko Endou, Numazu (JP); Kaoru Shinba, Numazu (JP); Katsumi Yamamoto, Numazu (JP); Yoshihiro Sugisawa, Numazu (JP)

(73) Assignee: Kokusan Denki Co., Ltd., Shizuoka-ken (JP)

( * ) Notice: Subject to any disclaimer, the term of this patent is extended or adjusted under 35 U.S.C. 154(b) by 253 days.

(21) Appl. No.: 10/970,540

(22) Filed: Oct. 21, 2004

(65) Prior Publication Data

US 2005/0104377 A1    May 19, 2005

(30) Foreign Application Priority Data

Oct. 31, 2003   (JP)   ............... 2003-372683

(51) Int. Cl.
*H02J 7/14*   (2006.01)
*H02P 9/30*   (2006.01)
*H02P 9/44*   (2006.01)

(52) U.S. Cl. ................. 322/28; 322/20; 322/29; 290/52

(58) Field of Classification Search ............ 322/20, 322/28, 29; 290/52
See application file for complete search history.

(56) References Cited

U.S. PATENT DOCUMENTS

| | | | | |
|---|---|---|---|---|
| 4,034,273 A | * | 7/1977 | Meek et al. ............... 318/149 |
| 4,951,769 A | * | 8/1990 | Kawamura ............... 180/65.4 |
| 4,967,334 A | * | 10/1990 | Cook et al. ............... 363/34 |
| 4,973,896 A | * | 11/1990 | Shiga et al. ............... 322/28 |
| 5,013,929 A | * | 5/1991 | Dhyanchand ............... 290/31 |
| 5,015,941 A | * | 5/1991 | Dhyanchand ............... 322/10 |
| 5,281,905 A | * | 1/1994 | Dhyanchand et al. ......... 322/32 |
| 5,747,959 A | * | 5/1998 | Iijima et al. ............... 318/762 |
| 6,134,124 A | * | 10/2000 | Jungreis et al. ............... 363/34 |
| 6,157,168 A | * | 12/2000 | Malik ............... 320/128 |
| 6,369,461 B1 | * | 4/2002 | Jungreis et al. ............... 307/46 |
| 6,487,096 B1 | * | 11/2002 | Gilbreth et al. ............... 363/35 |
| 6,534,958 B1 | * | 3/2003 | Graber et al. ............... 322/11 |
| 6,570,779 B1 | * | 5/2003 | Shimazaki et al. ............... 363/41 |
| 6,605,928 B1 | * | 8/2003 | Gupta et al. ............... 322/10 |
| 6,703,719 B1 | * | 3/2004 | McConnell ............... 290/52 |
| 6,737,762 B1 | * | 5/2004 | Koenig ............... 307/48 |
| 6,819,007 B1 | * | 11/2004 | Fukaya ............... 290/40 C |

(Continued)

FOREIGN PATENT DOCUMENTS

JP    2001-128463    5/2001

*Primary Examiner*—Nicholas Ponomarenko
*Assistant Examiner*—Pedro J. Cuevas
(74) *Attorney, Agent, or Firm*—Pearne & Gordon LLP

(57) ABSTRACT

A method for controlling an inverter controlled generator set which comprises a DC power source section having as a power source a generator driven by an engine and an inverter which converts an output of said DC power source section into an AC output, the method comprising a step of controlling a rotational speed of the engine so that the AC output suitable for driving a load is output from the inverter; wherein, after the engine is started, the rotational speed of the engine is controlled by a constant speed control mode for maintaining the rotational speed of the engine at a set rotational speed, and the rotational speed of the engine is increased to the set rotational speed; and wherein an operation of the inverter is started after the rotational speed of the engine reaches the set rotational speed.

18 Claims, 4 Drawing Sheets

U.S. PATENT DOCUMENTS

| | | | |
|---|---|---|---|
| 6,940,259 B1 * | 9/2005 | Suzuki et al. | 322/20 |
| 6,943,531 B1 * | 9/2005 | Fukaya | 322/10 |
| 6,995,478 B1 * | 2/2006 | Xu et al. | 290/52 |
| 7,078,826 B1 * | 7/2006 | Xu et al. | 290/52 |
| 2001/0048290 A1 * | 12/2001 | Underwood et al. | 322/20 |
| 2002/0030365 A1 * | 3/2002 | Underwood et al. | 290/40 B |
| 2002/0126517 A1 * | 9/2002 | Matsukawa et al. | 363/69 |
| 2004/0008009 A1 * | 1/2004 | Fukaya | 322/44 |
| 2005/0104377 A1 * | 5/2005 | Nakagawa et al. | 290/40 A |
| 2005/0117423 A1 * | 6/2005 | Ishikawa et al. | 365/203 |
| 2006/0086715 A1 * | 4/2006 | Briggs | 219/488 |
| 2006/0108988 A1 * | 5/2006 | McKelvey et al. | 323/205 |

* cited by examiner

INVERTER CONTROLLED GENERATOR SET AND METHOD FOR CONTROLLING THE SAME

TECHNICAL FIELD OF THE INVENTION

The present invention relates to an inverter controlled generator set comprising a DC power source section having as a power source a generator driven by an engine and an inverter which converts a DC output of said DC power source section to an AC output which is supplied to a load.

BACKGROUND OF THE INVENTION

An inverter controlled generator set comprises an engine, a DC power source section having as a power source a generator driven by the engine and an inverter converting an output of the DC power source section into an AC output to supply to a load as disclosed in, for example, Japanese Patent Application Laid-Open Publication No. 2001-128463.

Generally, an AC generator is used as a generator driven by an engine. In this case, a DC power source section comprises the generator, a rectifier circuit rectifying an AC output of the generator and a capacitor smoothing an output of the rectifier circuit.

The inverter comprises: a bridge type inverter circuit, each branch of a bridge being constituted by switch elements such as a transistor or a FET, and into which an output of the DC power source section is input; a controller for controlling the switch elements that constitute the inverter circuit so as to output an AC voltage having a predetermined frequency and a predetermined peak value from the inverter circuit; and a filter circuit which removes a high harmonic component from the AC voltage output from the inverter circuit.

The controller comprises a microprocessor and controls the switch elements constituting the inverter circuit so as to output from inverter a rated AC voltage having a constant effective value and a constant frequency.

In order to output the AC voltage having a desired rated value from the inverter controlled generator set of this type, it is necessary that an output voltage (an average value of the output voltage of the generator) of the DC power source section is higher than a voltage having a value which is a sum of a peak value of the output voltage (the AC voltage) of the inverter, a voltage drop generated in the switch elements of the inverter circuit and a voltage drop generated in the filter circuit. For example, in the case where a rated output voltage an effective value of which is 100V is generated from the inverter, it is necessary for the DC power source section to generate a DC voltage higher than an added voltage (150~160V) of a voltage (10~20V), which is the sum of the voltage drop generated in the switch elements of the inverter circuit and the voltage drop generated in the filter circuit, and approximately 140V of a peak value of the rated output voltage.

In general, when the engine is started, the rotational speed is gradually increased, and the output voltage of the generator is increased in accordance with the increase of the rotational speed. In a process of increasing the output voltage of the generator, a microprocessor of a controller is started first. Although the inverter becomes controllable if the microprocessor is started, the output voltage of the DC power source section has not reach a value required for outputting a rated voltage from the inverter when the microprocessor is started. Thus, if the control of the inverter is started as soon as the microcomputer is stared, the inverter generates only a lower voltage than the rated voltage.

If a load is connected to the inverter when the inverter is started under a condition that the rotational speed and the output voltage of the DC power source section (generator) is insufficient, the output voltage of the generator may become lower, and the load may not be started. Also, in the state where a warm-up of the engine is not completed, the engine is in an unstable state. Therefore, if the load is connected to the inverter when the inverter is started, the engine may be stalled.

In an inverter controlled generator set shown in Japanese Patent Application Laid-Open Publication No. 2001-128463, an operation of an inverter is started when it is confirmed that a predetermined time is passed and that an output voltage of a DC power source section becomes higher than a set value, after an engine is started and a microprocessor of a controller is started.

Also, in the inverter controlled generator set, in order to improve a fuel consumption rate of the engine and prevent an air pollution caused by an exhaust gas, a rotational speed of the engine is controlled so as to maintain the output voltage of the DC power source section at the set value.

As a generator driven by an engine, a magneto generator is often used. As it is widely well known, the magneto generator comprises a magneto rotor and a stator which includes a core having a magnetic pole portion opposed to a magnetic pole of the magnetic rotor and an armature coil wound around the core. An output characteristic (a characteristic of an output voltage VD versus an output current ID) of the magneto generator show a drooping characteristic, and the output voltage is rapidly decreased following an increase of the output current. The output characteristic of the magneto generator is determined by a constitution of a magnetic field and a constitution of a winding.

Now, it is assumed that the output characteristic of the DC power source section is a characteristic shown in a curve A in FIG. 5, in the case where the magneto generator is used as a generator and a rotational speed N [rpm] of the engine is constant. If the output voltage of the DC power source section required for outputting the rated voltage from the inverter is set Va, and the output current of the DC power source section when a rated load current flows is set Ia, an operating point is P when a rated load is applied. In the case where the output characteristic of the DC power source section is the characteristic shown in the curve A, when the inverter controlled generator set is put in a non-load state by disconnecting the load while the rotational speed of the engine is constant, the output voltage of the DC power source section is increased to Vo.

On the other hand, in order to output a constant rated voltage from the inverter, the DC power source section may generate the output voltage Va. Thus, a characteristic required for the DC power source section may be a characteristic outputting the constant output voltage Va between the non-load state and a rated operating state as shown in a characteristic B in FIG. 5.

As is apparent from FIG. 5, when the rotational speed of the engine is kept constant, the output voltage of the generator becomes higher than a required voltage when the load becomes lighter, which causes the engine to waste fuel. Thus, in the inverter controlled generator set, a constant voltage control is performed. In the constant voltage control, the output voltage Va of the DC power source section required for outputting the rated voltage from the inverter voltage is determined as a set voltage, and the rotational speed of the engine is controlled so that the output voltage Va of the DC power source section is kept at the set voltage in response to a change of the load of the inverter.

In the constant voltage control, the output voltage of the DC power source section is maintained at the set voltage Va in response to the change of the load as described hereinafter. As shown in FIG. 6, the rotational speed of the engine is controlled to maintain, in response to the change of the load, the output voltage of the DC power source section at the set voltage Va so as to let the rotational speed of the engine be N1 and the output characteristic of the DC power source section be a characteristic in a curve C when the inverter is in a no-load state, and to let the rotational speed of the engine be N2(>N1) and the output characteristic of the DC power source section be a characteristic in a curve D when the load of the inverter is, for example, one half of the rated load. Also, the rotational speed of the engine is controlled to maintain, in response to the change of the load, the output voltage of the DC power source section at the set voltage Va so as to let the rotational speed of the engine be N3(>N2) and the output characteristic of the DC power source section be a characteristic in a curve A when the load of the inverter is the rated load. Since the rotational speed of the engine is lowered when the load of the inverter is light or in the no-load state, such a constant voltage control not only improve the fuel consumption rate but also prevent an air pollution caused by exhaust gas by reducing an exhaust amount of $CO_2$.

As aforementioned, in the inverter controlled generator set, when the rotational speed of the engine is controlled so as to maintain the output voltage of the DC power source section at the set voltage according to the change of the load, the fuel consumption rate of the engine can be controlled, and the air pollution caused by exhaust gas can be reduced. Therefore, as shown in the inverter controlled generator set disclosed in Japanese Patent Application Laid-Open Publication No. 2001-128463, the constant voltage control as stated above may be performed in the case where it is confirmed that the predetermined time is passed and that the output voltage of the DC power source section becomes higher than the set value, after the engine is started-and the microprocessor of the controller is started.

In the case where the control of the inverter is started when the predetermined time is passed after the CPU is started and when the output voltage of the generator becomes higher than the set value, there is no problem to perform the constant voltage control to lower the rotational speed of the engine, since almost no load is applied to the generator until the inverter is started. However, in the case where a large load is connected to the inverter when the inverter is started while the rotational speed of the engine is lowered by the constant voltage control, the output voltage of the generator is lowered significantly since the large load is applied to the generator by flowing a large load current through the generator at the moment when the inverter is started. At this time, the constant voltage control is operated in order to increase the rotational speed; however, the constant voltage control cannot increase the rotational speed enough when the load is large, which makes difficult to drive the load. In addition, the engine may be stalled if the inverter is started in a condition where the engine is in an unstable state, for example, a condition where the warm-up of the engine is not completed.

SUMMARY OF THE INVENTION

Therefore, an object of the invention is to provide an inverter controlled generator set that can provide an electric power for a load stably without stalling an engine even if a starting operation of the engine is performed in the state where a large load is connected to an inverter, and to provide a control method thereof.

According to the present invention, there is provided a method for controlling an inverter controlled generator set which comprises: an engine; a DC power source section having a generator driven by the engine as a power source; and an inverter which converts an DC output of said DC power source section into an AC output that is supplied to a load, and the method comprises a step of controlling a rotational speed of the engine so that the AC output suitable for driving the load is output from the inverter.

In the present invention, after the engine is started, the rotational speed of the engine is controlled by a constant speed control mode for maintaining the rotational speed of the engine at a set rotational speed, until the rotational speed of the engine is increased to the set rotational speed, and an operation of the inverter is started after the rotational speed of the engine reaches the set rotational speed.

According to one aspect of the invention, after the engine is started, the rotational speed of the engine is controlled by the constant speed control mode for maintaining the rotational speed of the engine at the set rotational speed, until the rotational speed of the engine is increased to the set rotational speed, and then the operation of the inverter is started, and when a predetermined control mode proceeding requirement is satisfied, a control mode of the engine is switched to a constant voltage control mode for controlling the rotational speed of the engine so as to maintain an output voltage of the DC power source section at a set value.

As aforementioned, if the rotational speed of the engine is increased to the set rotational speed after the engine is started, and then the operation of the inverter is started, the operation of the inverter can be started in a state where the generator outputs a fully high voltage. Therefore, even if, after the engine is started, the load is connected to the inverter when the operation of the inverter is started, the load can be smoothly driven by outputting a rated voltage from the inverter without lowering the output voltage of the generator and without stalling the engine.

Also, if, after the predetermined control mode proceeding requirement is satisfied, the control mode of the engine is switched to the constant voltage control mode for controlling the rotational speed of the engine so as to maintain the output voltage of the DC power source section at the set value as described above, the rotational speed of the engine is lowered at a light-load state and at a no-load state. Such a constant voltage control not only improves a fuel consumption rate but also prevents an air pollution caused by exhaust gas by reducing an exhaust amount of $CO_2$.

The aforementioned control at the constant speed control mode may be performed only in the state where the engine requires a warm-up at start of the engine. Thus, in another aspect of the invention, when the engine is in the state of requiring the warm-up at the start of the engine, the rotational speed of the engine is controlled by the constant speed control mode for maintaining the rotational speed of the engine at the set rotational speed, until the rotational speed of the engine is increased to the set rotational speed, and the operation of said inverter is started after the rotational speed of the engine reaches the set rotational speed. Also in this case, it is preferable that, when the predetermined control mode proceeding requirement is satisfied, the control mode of the engine is switched to the constant voltage control mode for controlling the rotational speed of the engine so as to maintain the output voltage of the DC power source section at the set value. When the load is input while the warm-up of the engine is performed, it is preferable to increase the rotational speed of the engine to the set rotational speed by controlling the rotational speed by the constant speed control mode until the warm-up of the engine is completed, even if the control mode proceeding requirement is satisfied.

The aforementioned control mode proceeding requirement is a requirement for allowing the control mode to be switched to the constant voltage control mode. In one aspect of the invention, the control mode proceeding requirement is that a predetermined time is passed after starting the constant speed control mode.

In another aspect of the invention, the control mode proceeding requirement is that a predetermined time is passed after starting the constant speed control mode and that the output voltage of the generator becomes stable.

It is preferable that the above set rotational speed is set higher than a rotational speed at which the inverter can generate a rated output (the product of the rated output voltage multiplied by the rated load current).

The inverter controlled generator set carrying out the above control method comprises: an engine; a DC power source section having a generator driven by the engine as a power source to generate a DC output; an inverter into which the output of the DC power source section is input; inverter control means for controlling the inverter so as to output a desired AC voltage from the inverter; and rotational speed control means for controlling a rotational speed of the engine so that an AC output suitable for driving a load of the inverter is output from the inverter. The rotational speed control means comprises: constant rotational speed control means for controlling the rotational speed of the engine so as to maintain the rotational speed of the engine at a set rotational speed; constant voltage control means for controlling the rotational speed of the engine so that an output voltage of the DC power source section is kept at a set value; and control mode switching means for switching a control mode of the engine so that the control mode is set to a constant speed control mode for controlling the rotational speed by the constant rotational speed control means, until a predetermined control mode proceeding requirement is satisfied after starting the engine, and so that the control mode of the engine is switched to a constant voltage control mode for controlling the rotational speed by the constant voltage control means when the control mode proceeding requirement is satisfied. The inverter control means is comprised so as to start control of the inverter when the rotational speed of the engine reaches the set rotational speed after starting the engine.

The control mode switching means may be comprised so that the control mode is set to the constant speed control mode for controlling the rotational speed by the constant rotational speed control means, until the predetermined control mode proceeding requirement is satisfied after starting the engine in the state where the engine requires the warm-up at starting the engine, and so that the control mode of the engine is switched to the constant voltage control mode for controlling the rotational speed by the constant voltage control means when the control mode proceeding requirement is satisfied and when the engine does not require the warm-up at starting.

The above control mode switching means is constituted so that, when the load is input while the engine performs the warm-up, the control mode for the rotational speed of the engine is set as the constant speed control mode even if the control mode proceeding requirement is fulfilled.

As described above, according to the present invention, since the rotational speed of the engine is increased to the set rotational speed after the engine is started, and then the operation of the inverter is started, the operation of the inverter can be started in a state where the generator outputs a fully high voltage. Therefore, even if, after the engine is started, a load is connected to the inverter when the operation of the inverter is started, the load can be smoothly driven by outputting a rated voltage from the inverter without lowering the output voltage of the generator and without stalling the engine.

Also, in the present invention, if, after the predetermined control mode proceeding requirement is satisfied, the control mode of the engine is switched to the constant voltage control mode for controlling the rotational speed of the engine so as to maintain the output voltage of the DC power source section at the set value, the rotational speed of the engine can be lowered at a light-load state and at a no-load state. Such a control not only improves the fuel consumption rate but also prevents an air pollution caused by exhaust gas by reducing an exhaust amount of $CO_2$.

BRIEF DESCRIPTION OF THE DRAWINGS

The above and other objects and features of the invention will be apparent from the detailed description of the preferred embodiments of the invention, which are described and illustrated with reference to the accompanying drawings, in which.

DETAILED DESCRIPTION OF THE PREFERRED EMBODIMENTS

Figure 1:
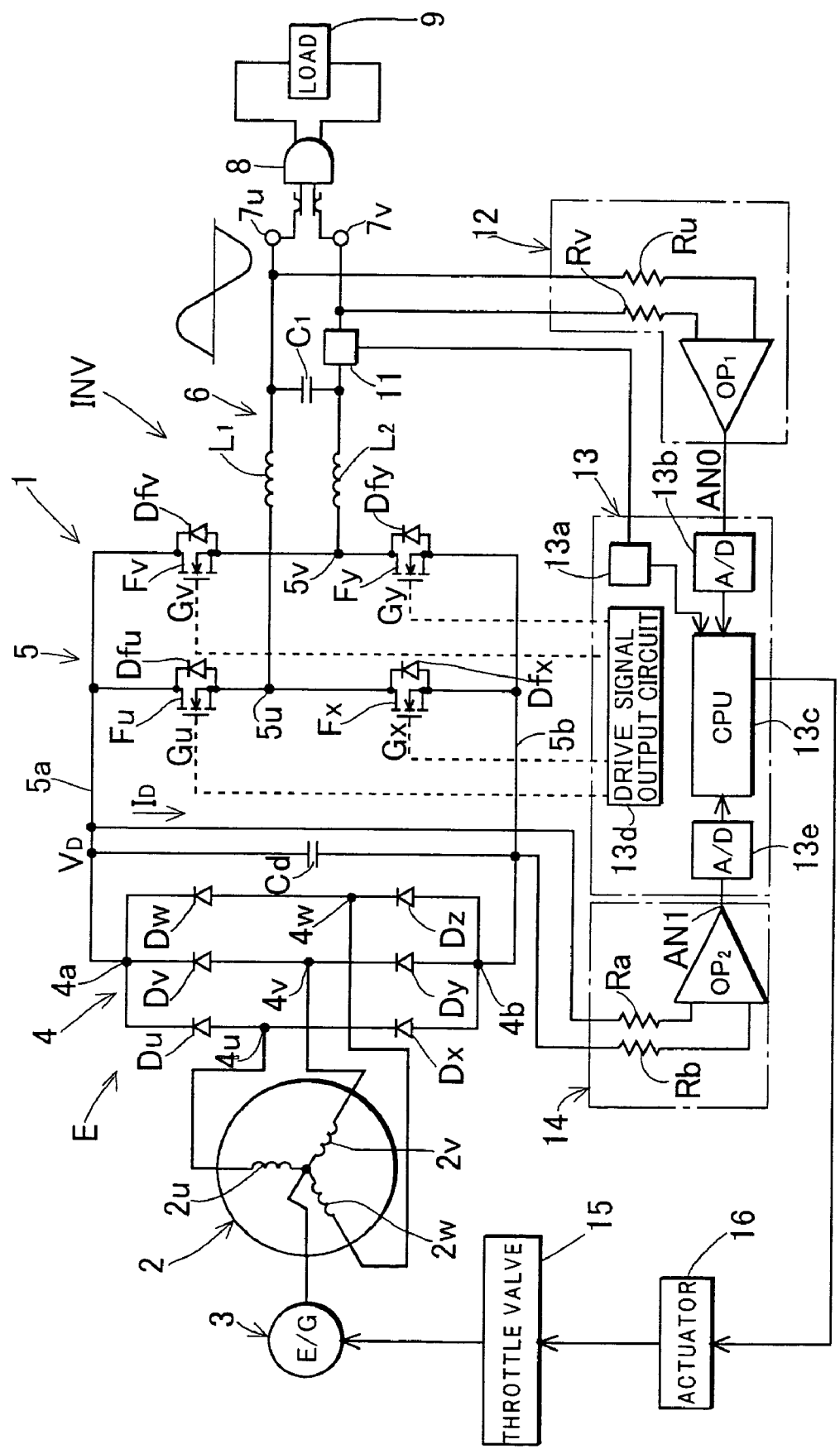
FIG. 1 is a circuit diagram of an example of a construction of a hardware part of an inverter controlled generator set according to the invention.

FIG. 1 shows an example of a construction of a hardware of an inverter controlled generator set 1 according to the invention. In FIG. 1, a reference numeral 2 denotes a three-phase magneto generator, and 3 denotes an engine (E/G) that drives the magneto generator 2. The magneto generator 2 includes a multi-polar magnetic rotor (not shown), and a stator having three-phase connected armature coils $2u$ to $2w$, and the unshown magnetic rotors are mounted to a crankshaft of the engine 3.

A reference numeral 4 denotes a three-phase diode bridge full-wave rectifier constituted by diodes Du to Dw and Dx to Dz. Three-phase output terminals of the generator 2 are connected to three-phase AC input terminals 4u to 4w of the rectifier 4, and a power supply capacitor Cd is connected across DC output terminals 4a and 4b of the rectifier 4. In the shown example, a DC power source section E that uses the generator driven by the engine as a power supply to output a DC voltage is comprised of the generator 2, the engine 3, the rectifier 4, and the power supply capacitor Cd.

A reference numeral 5 denotes a bridge type inverter circuit (a power conversion circuit) using MOSFETs Fu and Fv, Fx and Fy as switch elements, and in the inverter circuit, an H bridge circuit is constructed by a first arm and a second arm connected in parallel, the first arm including the MOSFETs Fu and Fx connected in series and the second arm including the MOSFETs Fv and Fy connected in series. In this example, the MOSFETs Fu and Fv constitute switch elements in upper rows of the first arm and the second arm, respectively, and the MOSFETs Fx and Fy constitute switch elements in lower rows of the first arm and the second arm, respectively.

Parasitic diodes Dfu and Dfv, Dfx and Dfy are formed across drain and source of the MOSFETs Fu and Fv, Fx and Fy. An anode and a cathode of each parasitic diode are connected to the source and the drain of the corresponding MOSFET. A pair of input terminals 5a and 5b of the inverter circuit 5 are connected to the output terminals 4a and 4b of the rectifier 4, and a pair of output terminals 5u and 5v of the inverter circuit 5 are connected to a pair of load connecting terminals 7u and 7v, respectively, through a low-pass filter circuit 6 constituted by inductances L1 and L2 and a capacitor C1. A load 9 is connected to the load connecting terminals 7u and 7v through a known connector 8 including a receptacle and a plug. An inverter INV is comprised by the inverter circuit 5 and the filter circuit 6.

A reference numeral 11 denotes a load current detection circuit that detects a current supplied from the inverter to the load, 12 denotes a load voltage detection circuit that includes an operational amplifier OP1, and resistances Ru and Rv connecting input terminals of the operational amplifier to the load connecting terminals 7u and 7v. An output of the load current detection circuit 11 and an output of the load voltage detection circuit 12 are input to a controller 13 for controlling the switch elements of the inverter circuit and the engine 3.

The controller 13 includes a comparator 13a comparing the output of the load current detection circuit 11 with a reference signal, an A/D converter 13b that converts the output of the load voltage detection circuit 12 into a digital signal, a ROM (not shown), a RAM (not shown), a CPU (a microprocessor) 13c, a drive signal output circuit 13d that provides drive signals Gu, Gv, Gx, and Gy to gates of the FETs Fu, Fv, Fx, and Fy according to a PWM signal generated by the CPU, and an A/D converter 13e that converts a detection value of an output voltage of the rectifier 4 into a digital signal. In this embodiment, a power source voltage is applied to the controller 13 from a constant voltage power source circuit (not shown) which converts the output voltage of the DC power source section E to a constant DC voltage.

The voltage across the output terminals of the rectifier 4 (the output voltage of the DC power source section) is applied to input terminals of an operational amplifier OP2 through resistances Ra and Rb, and an output of the operational amplifier OP2 is input to the A/D converter 13e in the controller 13. A power supply output detection circuit 14 that detects the output voltage of the DC power source section is comprised of the resistances Ra and Rb and the operational amplifier OP2.

The controller 13 comprises inverter control means 20 (refer to FIG. 2) for controlling the switch elements of the inverter circuit 5 so as to output a desired AC voltage through the load connecting terminals 7u and 7v by executing a predetermined program by the CPU 13c. The inverter control means 20 starts a control operation when the rotational speed of the engine 3 reaches a set rotational speed Ns at starting of the engine, reads data AN1 of the DC output voltage of the DC power source section obtained from the rectifier 4 through the operational amplifier OP2 and the A/D converter 13e, and turns on/off the predetermined switch elements of the inverter circuit at a duty factor determined by the output voltage (AN1) and an instantaneous value of a reference voltage (a voltage to be obtained across the load connecting terminals) at a switch timing appearing in each PWM cycle. Thus, an AC voltage having a constant frequency and a constant effective value is output across the load connecting terminals 7u, 7v. The above set rotational speed Ns (a rotational speed at which the inverter is started) is set higher than a rotational speed at which the inverter INV can generate a rated output voltage.

The inverter control means 20 also reads data AN0, which provides the instantaneous value of the voltage obtained across the load connecting terminals, through an operational amplifier OP1 and an A/D converter 13b, corrects the duty factor so as to make a duty factor of the PWM signal smaller when the data AN0 is larger than reference data providing the instantaneous value of the reference voltage, and performs a control to bring a deviation between the instantaneous value of the voltage detected by the load voltage detection circuit 12 and the instantaneous value of the reference voltage to zero.

In the inverter controlled generator set shown in FIG. 1, excess current protection means is provided to perform a control for blocking an excess current by stopping supply of the drive signals to the switch elements of the inverter 5 when the excess current more than the set value flows through the load connecting terminals 7u, 7v.

The controller 13 is performed as means for controlling an actuator 16 that operates a throttle valve 15, and a drive current is provided from the CPU 13c through a drive circuit not shown to the actuator 16. Rotational speed detection means 21 (Refer to FIG. 2) for detecting the rotational speed of the engine and rotational speed control means for controlling the rotational speed by controlling an opening degree of a throttle valve 15 are constructed by causing the CPU 13c to execute a predetermined program. The actuator 16 may use a solenoid or a motor, such as a step motor, as a primary drive.

The rotational speed detection means 21 comprises a signal generating device that is mounted on the engine and generates a pulse at a predetermined rotational angle position of the engine and rotational speed arithmetical operation means that arithmetically operates the rotational speed of the engine from an interval of the pulse generated by the signal generating device.

Figure 2:
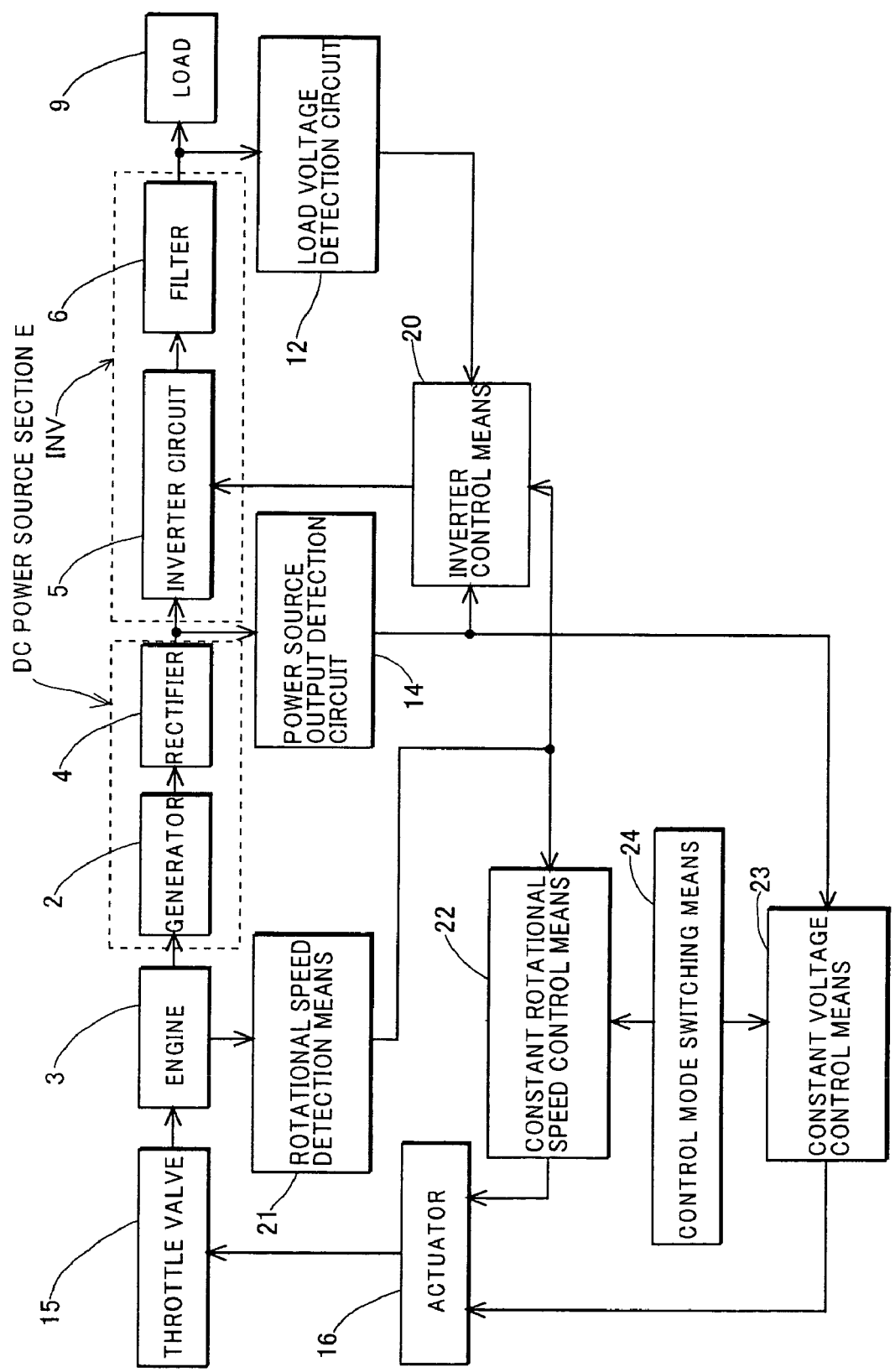
FIG. 2 is a block diagram of a means constituted by a microprocessor together with a construction of a main part of a hardware provided in the inverter controlled generator set in FIG. 1.

As shown in FIG. 2, the rotational speed control means comprises: constant rotational speed control means 22 for controlling the rotational speed of the engine at a constant speed control mode so as to maintain the rotational speed of the engine at a set rotational speed; constant voltage control means 23 for controlling the rotational speed of the engine at a constant voltage control mode so that an output voltage of the DC power source section is kept at a set value; and control mode switching means 24 for switching a control mode of the engine so that the control mode is set to a constant speed control mode for controlling the rotational speed by the constant rotational speed control means 22, until a predetermined control mode proceeding requirement is satisfied after starting the engine, and so that the control mode of the engine is switched to a constant voltage control mode for controlling the rotational speed by the constant voltage control means when the control mode proceeding requirement is satisfied.

Figure 6:
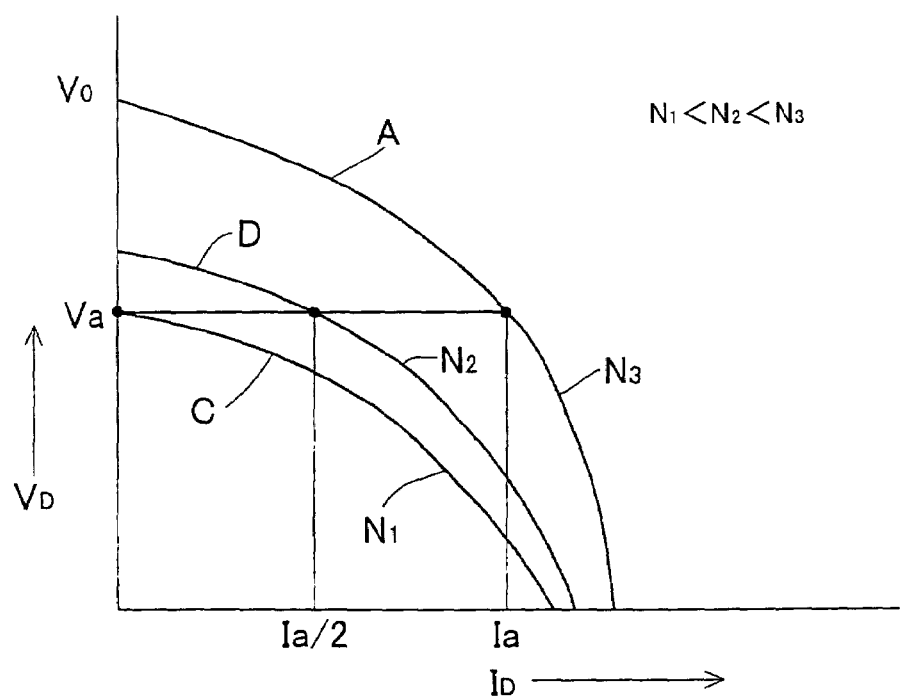
FIG. 6 is a graph showing, using a rotational speed as a parameter, an example of an output characteristic of a DC power source section used in an inverter controlled generator set to which the present invention is applied.

In this embodiment, the inverter and the rotational speed of the engine are controlled by a method described below. When the engine is started, and the CPU 13c is started after an output voltage of its power source is established, the control mode switching means 24 causes the constant rotational speed control means 22 to start the control of the rotational speed of the engine by the constant speed control mode, which makes the rotational speed of the engine increase toward the set rotational speed Ns. The set rotational speed Ns is set higher than a rotational speed at which the inverter can generate a rated output (the product of a rated output voltage multiplied by a rated load current). In the case where the generator has an output characteristic shown in FIG. 6, the set rotational speed Ns is set higher than N3.

When the rotational speed reaches the set rotational speed Ns, the inverter control means 20 starts controlling the inverter circuit 5, and outputs a constant AC voltage from the inverter INV. When a predetermined control mode proceeding requirement is satisfied after the engine is started, the control mode switching means 24 switches the control mode to the constant voltage control mode, and the control of the rotational speed is switched to the control by the constant voltage control means 23. In the constant voltage control mode, it is performed a control for maintaining the output voltage of the DC power source section E detected by the power supply output detection circuit 14 at a set value. That is, the rotational speed of the engine is controlled so as to maintain the output voltage of the DC power source section E at the set value by controlling the opening degree of the throttle valve so as to decrease the rotational speed of the engine when the output voltage of the DC power source section E is higher than the set value, and controlling the opening degree of the throttle valve so as to increase the rotational speed of the engine when the output voltage of the DC power source section E is lower than the set value.

The set value of the output voltage of the DC power source section is set higher than a voltage having a value which is a sum of a peak value of the rated output voltage of the inverter, a voltage drop generated in the switch elements of the inverter circuit 5 and a voltage drop generated in the filter circuit 6.

The aforementioned control mode proceeding requirement is that a predetermined time is passed after the control at the constant speed control mode is started, for example. In this case, the predetermined time is set within a time until a rotation of the engine becomes stable. The predetermined time may be constant, or may be varied according to a temperature of the engine. The predetermined time is experimentally obtained. In the case where the predetermined time is varied by a parameter such as the temperature of the engine, a map providing a relationship between the parameter and the predetermined time may be prepared, and the predetermined time may be obtained by searching the map for the detected parameter.

Figure 3:
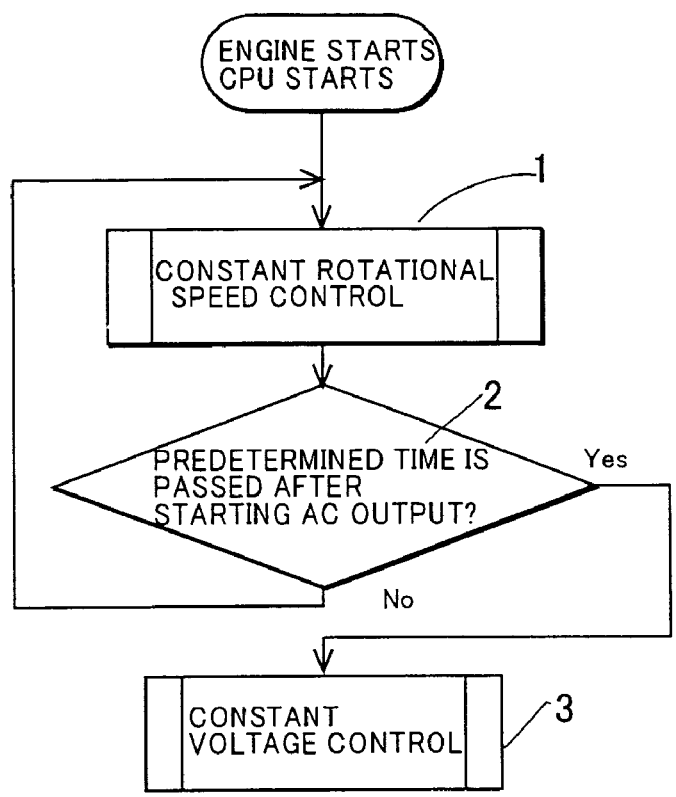
FIG. 3 is a flowchart showing an algorithm of a program executed by a microprocessor in order to constitute control mode switching means used in an embodiment of the present invention.

FIG. 3 shows a flowchart of an algorithm of a program executed by a microprocessor in order to constitute the above control mode switching means. In this algorithm, when the engine is started, and the CPU is started, the constant rotational speed control means 22 starts controlling the rotational speed of the engine at Step 1 at first. Then, at Step 2, whether or not the predetermined time is passed after the inverter starts outputting the AC voltage is determined. As the result, when it is determined that the predetermined time is not passed, a step returns to Step 1, and when it is determined that the predetermined time is passed, the step goes to Step 3, and the constant voltage control means 23 starts controlling the rotational speed of the engine.

Also, the aforementioned control mode proceeding requirement may be that the predetermined time is passed and that the output voltage of the generator 2 becomes stable, after the constant speed mode is started. Whether or not the output voltage of the generator 2 becomes stable is determined by a rate of change of the output voltage of the DC power source section E relative to time. For example, the output voltage of the DC power source section is sampled at constant sampling intervals $\Delta T$ while the rotational speed of the engine is maintained at the set rotational speed Ns, a voltage change amount $\Delta V$ is obtained by arithmetically operating a difference between a previous sampling value and a current sampling value, a rate of voltage change $\Delta V/\Delta T$ is obtained from the voltage change amount $\Delta V$ and the constant sampling intervals $\Delta T$, and then, it can be determined that the output voltage of the generator becomes stable if the rate of voltage change $\Delta V/\Delta T$ becomes less than a set judgment value.

As aforementioned, if the rotational speed of the engine is increased to the set rotational speed after the engine is started and then the operation of the inverter is started, the operation of the inverter can be started in a state where the generator outputs a fully high voltage. Therefore, even if, after the engine is started, the load is already connected to the inverter when the operation of the inverter is started, the load can be smoothly driven by outputting the rated voltage from the inverter without lowering the output voltage of the generator and without stalling the engine.

Also, if, after the control mode proceeding requirement is satisfied, the control mode of the engine is switched to the constant voltage control mode for controlling the rotational speed of the engine so as to maintain the output voltage of the DC power source section at the set value as described above, the rotational speed of the engine is lowered at a light-load state and at a no-load state. Such a constant voltage control not only improves the fuel consumption rate but also prevents an air pollution caused by exhaust gas by reducing an exhaust amount of $CO_2$.

In the above embodiment, the control of the rotational speed of the engine at the constant speed control mode is performed every time the engine is started, and the CPU is started. However, only in the state where the engine requires a warm-up at starting the engine, the control of the rotational speed of the engine may be performed at the constant speed control mode for controlling the rotational speed of the engine so as to maintain the rotational speed at the set rotational speed.

Thus, when the control of the rotational speed of the engine is performed at the constant speed control mode only in the state where the engine requires the warm-up, the inverter control means 20 is constituted so that the operation of the inverter is started after the rotational speed of the engine reaches the set rotational speed Ns. The control mode switching means switches the control of the rotational speed of the engine to the control at the constant voltage control mode when the predetermined control mode proceeding requirement is satisfied.

Figure 4:
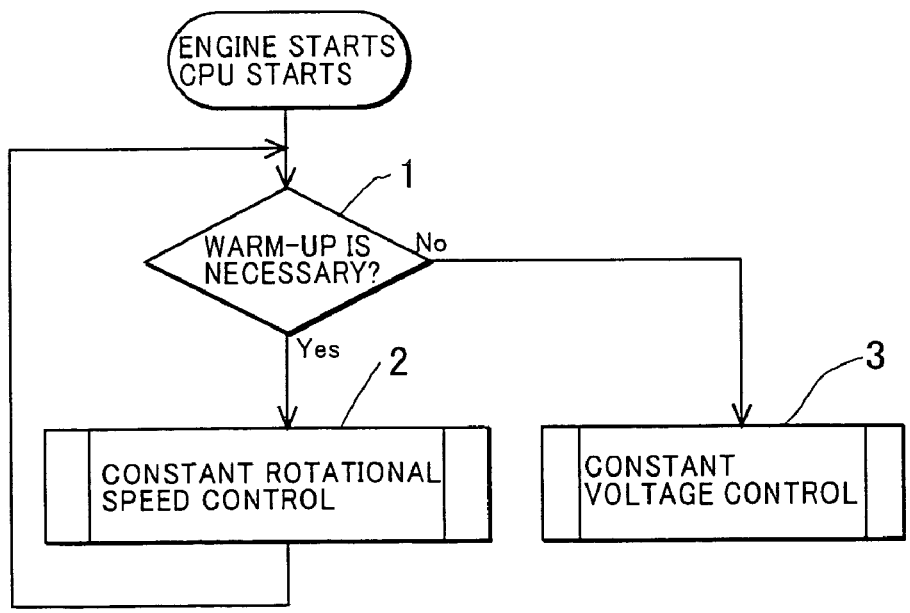
FIG. 4 is a flowchart showing an algorithm of a program executed by a microprocessor in order to constitute control mode switching means used in another embodiment of the present invention.
Figure 5:
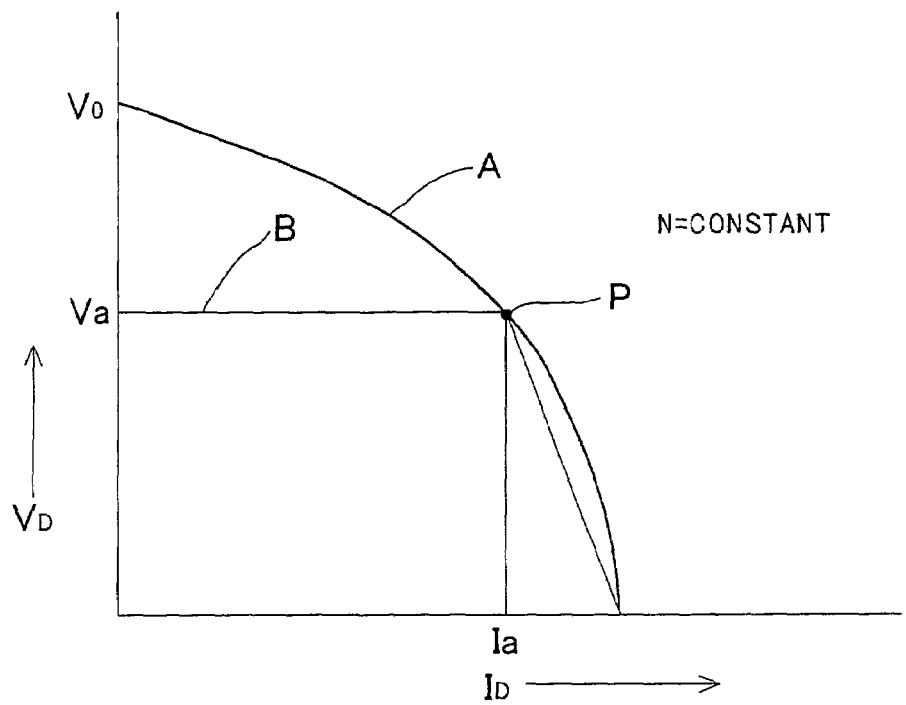
FIG. 5 is a graph showing an example of an output characteristic of a DC power source section used in an inverter controlled generator set to which the present invention is applied.

FIG. 4 shows a flowchart of an algorithm of a program executed by a microprocessor in order to constitute the control mode switching means in the case of performing the control of the rotational speed at the constant control mode only when the warm-up of the engine is required as described above. In this algorithm, when the engine is started, and the CPU is started, whether or not the warm-up of the engine is required is determined at Step 1 at first. If the warm-up is required, a step goes to Step 2 and starts controlling the rotational speed of the engine by the constant rotational speed control means. If the warm-up of the engine is not required, the step goes to Step 3 and starts controlling the rotational speed of the engine by the constant voltage control means.

When the warm-up of the engine is not required (When a temperature of the engine is high enough to be able to operate the engine stably immediately after the engine is started), there is no possibility that the engine is stalled even if the large load is applied to the generator, since the rotation of the engine becomes stable immediately after the engine is started. In addition, it is possible to abruptly start the control by the constant voltage control mode without performing the control by the constant speed control mode, since the engine is in a state of increasing the rotational speed if the throttle valve is opened.

As stated above, in the case where the control of the rotational speed of the engine at the constant speed control mode is performed only when the engine requires the warm-up at starting the engine, it is preferable to constitute the control mode switching means 24 so that the rotational speed of the engine is controlled by the constant speed control mode until the warm-up of the engine is completed, even if the control mode proceeding requirement is satisfied, when the load is input during the warm-up.

Although, in the above description, the inverter and the rotational speed of the engine are controlled by one controller, each controller for controlling the inverter and the rotational speed of the engine may be provided separately.

In the invention, the rotational speed of the engine is controlled so as to maintain the output voltage of the DC power source section at the set value by the constant voltage control mode, which is the same as that controlled so as to maintain the output voltage of the generator at the set value. In other words, it can be expressed that "the rotational speed of the engine is controlled so as to maintain the output voltage of the generator at the set value by the constant voltage control mode" in stead of "the rotational speed of the engine is controlled so as to maintain the output voltage of the DC power source section at the set value by the constant voltage control mode".

In the inverter controlled generator set described above, the output voltage of the DC power source section is monitored for maintaining the output voltage at the set value. However, when a control rectifier circuit having a diode and a thyristor is used, and the output voltage of the DC power source section is maintained constant by controlling the conduction angle of the thyristor, a current value of the output voltage of the DC power source section can be predicted from a conduction angle of the thyristor.

It is preferable that the set rotational speed Ns at the constant speed mode is sufficiently high for maintaining the output voltage of the inverter at a desired value while connecting the rated load to the inverter, but, the set rotational speed Ns may be a rotational speed that can maintain the output voltage of the inverter at the rated voltage when flowing a load current smaller than the rated load current, since the rotational speed may be increased to an extent that the engine does not stall when an operation of the inverter is started while the load is applied to the inverter.

In the above described embodiment, the rotational speed of the engine is controlled by controlling the opening degree of the throttle valve, but when an ISC (Idle Speed Control) valve for adjusting an amount of air flowing through a passage bypassing the throttle valve is provided, the rotational speed of the engine may be controlled by controlling an opening degree of the ISC valve.

Although preferred embodiments of the invention have been described and illustrated with reference to the accompanying drawings, it will be understood by those skilled in the art that it is by way of example, and that various changes and modifications may be made without departing from the spirit and scope of the invention, which is defined only to the appended claims.

What is claimed is:

1. A method for controlling an inverter controlled generator set which comprises: an engine; a DC power source section having a generator driven by said engine as a power source; and an inverter which converts an DC output of said DC power source section into an AC output that is supplied to a load, and said method comprising a step of controlling a rotational speed of said engine so that the AC output suitable for driving said load is output from said inverter, wherein, after the engine is started, the rotational speed of said engine is controlled by a constant speed control mode for maintaining the rotational speed of said engine at a set rotational speed, until the rotational speed of the engine is increased to the set rotational speed, and wherein an operation of said inverter is started after the rotational speed of said engine reaches said set rotational speed.

2. A method for controlling an inverter controlled generator set as set forth in claim 1, wherein said set rotational speed is set higher than a rotational speed at which said inverter starts generating a rated output.

3. A method for controlling an inverter controlled generator set which comprises: an engine; a DC power source section having a generator driven by said engine as a power source; and an inverter which converts an DC output of said DC power source section into an AC output that is supplied to a load, and said method comprising a step of controlling a rotational speed of said engine so that the AC output suitable for driving said load is output from said inverter, wherein, after the engine is started, the rotational speed of said engine is controlled by a constant speed control mode for maintaining the rotational speed of said engine at a set rotational speed, until the rotational speed of the engine is increased to the set rotational speed, and then an operation of said inverter is started, and wherein, when a predetermined control mode proceeding requirement is satisfied, a control mode of said engine is switched to a constant voltage control mode for controlling the rotational speed of said engine so as to maintain an output voltage of said DC power source section at a set value.

4. A method for controlling an inverter controlled generator set as set forth in claim 3, wherein said set rotational speed is set higher than a rotational speed at which said inverter starts generating a rated output.

5. A method for controlling an inverter controlled generator set as set forth in claim 3, wherein said control mode proceeding requirement is that a predetermined time is passed after starting said constant speed control mode.

6. A method for controlling an inverter controlled generator set as set forth in claim 3, wherein said control mode proceeding requirement is that a predetermined time is passed after starting said constant speed control mode and that the output voltage of said generator becomes stable.

7. A method for controlling an inverter controlled generator set which comprises: an engine; a DC power source section having a generator driven by said engine as a power source; and an inverter which converts an DC output of said DC power source section into an AC output that is supplied to a load, and said method comprising a step of controlling a rotational speed of said engine so that the AC output suitable for driving said load is output from said inverter,
wherein, when said engine is in a state of requiring a warm-up at the start of the engine, the rotational speed of the engine is controlled by a constant speed control mode for maintaining the rotational speed of said engine at a set rotational speed, until the rotational speed of the engine is increased to the set rotational speed, and
wherein an operation of said inverter is started after the rotational speed of said engine reaches said set rotational speed.

8. A method for controlling an inverter controlled generator set as set forth in claim 7, wherein said set rotational speed is set higher than a rotational speed at which said inverter starts generating a rated output.

9. A method for controlling an inverter controlled generator set which comprises: an engine; a DC power source section having a generator driven by said engine as a power source; and an inverter which converts an DC output of said DC power source section into an AC output that is supplied to a load, and said method comprising a step of controlling a rotational speed of said engine so that the AC output suitable for driving said load is output from said inverter,
wherein, when said engine is in a state of requiring a warm-up at the start of the engine, the rotational speed of the engine is controlled by a constant speed control mode for maintaining the rotational speed of said engine at a set rotational speed, until the rotational speed of the engine is increased to the set rotational speed, and an operation of said inverter is started after the rotational speed of said engine reaches said set rotational speed,
wherein, when a predetermined control mode proceeding requirement is satisfied, a control mode of said engine is switched to a constant voltage control mode for controlling the rotational speed of said engine so as to maintain an output voltage of said DC power source section at a set value, and
wherein, when said load is input while said engine performs the warm-up, the rotational speed of the engine is controlled by said constant speed control mode even if said control mode proceeding requirement is fulfilled.

10. A method for controlling an inverter controlled generator set as set forth in claim 9, wherein said set rotational speed is set higher than a rotational speed at which said inverter starts generating a rated output.

11. A method for controlling an inverter controlled generator set as set forth in claim 9, wherein said control mode proceeding requirement is that a predetermined time is passed after starting said constant speed control mode.

12. A method for controlling an inverter controlled generator set as set forth in claim 9, wherein said control mode proceeding requirement is that a predetermined time is passed after starting said constant speed control mode and that the output voltage of said generator becomes stable.

13. An inverter controlled generator set which comprises: an engine; a DC power source section having a generator driven by said engine as a power source to generate a DC output; an inverter into which the output of said DC power source section is input; inverter control means for controlling said inverter so as to output a desired AC voltage from said inverter; and rotational speed control means for controlling a rotational speed of said engine so that an AC output suitable for driving a load of said inverter is output from said inverter,
wherein said rotational speed control means comprises: constant rotational speed control means for controlling the rotational speed of said engine so as to maintain the rotational speed of the engine at a set rotational speed; constant voltage control means for controlling the rotational speed of said engine so that an output voltage of said DC power source section is kept at a set value; and control mode switching means for switching a control mode of the engine so that the control mode is set to a constant speed control mode for controlling the rotational speed by said constant rotational speed control means, until a predetermined control mode proceeding requirement is satisfied after starting said engine, and so that the control mode of the engine is switched to a constant voltage control mode for controlling the rotational speed by said constant voltage control means when said control mode proceeding requirement is satisfied, and
wherein said inverter control means is comprised so as to start control of said inverter when said rotational speed of the engine reaches said set rotational speed after starting the engine.

14. An inverter controlled generator set as set forth in claim 13, wherein said control mode proceeding requirement is that a predetermined time is passed after starting said constant speed control mode.

15. An inverter controlled generator set which comprises: an engine; a DC power source section having a generator driven by said engine as a power source to generate a DC output; an inverter into which the output of said DC power source section is input; inverter control means for controlling said inverter so as to output a desired AC voltage from said inverter; and rotational speed control means for controlling a rotational speed of said engine so that an AC output suitable for driving a load of said inverter is output from said inverter,
wherein said rotational speed control means comprises: constant rotational speed control means for controlling the rotational speed of said engine so as to maintain a set rotational speed; constant voltage control means for controlling the rotational speed of said engine so that an output voltage of said DC power source section is kept at a set value; and control mode switching means for switching a control mode of the engine so that the control mode is set to a constant speed control mode for controlling the rotational speed by said constant rotational speed control means, until a predetermined control mode proceeding requirement is satisfied after starting said engine in the state where said engine requires a warm-up at starting the engine, and so that the control mode of the engine is switched to a constant voltage control mode for controlling the rotational speed by said constant voltage control means when said control mode proceeding requirement is satisfied and when said engine does not require the warm-up at starting, and wherein said inverter control means is comprised so as to start control of said inverter when said rotational speed of the engine reaches said set rotational speed after starting the engine.

16. An inverter controlled generator set as set forth in claim 15, wherein said control mode switching means is constituted so that, when said load is input while said engine performs the warm-up, said control mode for the rotational speed of the engine is set as said constant speed control mode even if said control mode proceeding requirement is fulfilled.

17. An inverter controlled generator set as set forth in claim 15, wherein said control mode proceeding requirement is that a predetermined time is passed after starting said constant speed control mode.

18. An inverter controlled generator set as set forth in claim 15, wherein said control mode proceeding requirement is that a predetermined time is passed after starting said constant speed control mode and that the output voltage of said generator becomes stable.

* * * * *